June 12, 1928.　　　　　　　　　　　　　　　　1,673,439
J. BJORNLIE
RIM TOOL
Filed June 21, 1926　　　　　　2 Sheets-Sheet 1
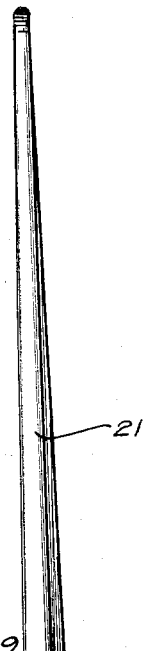
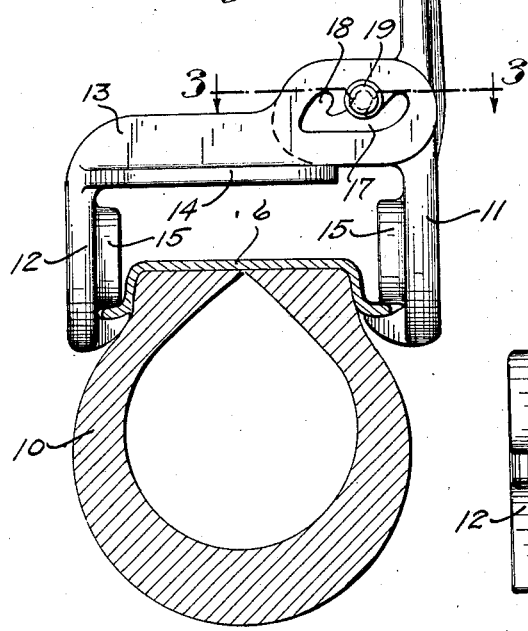
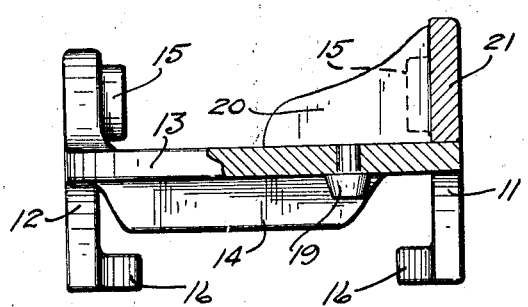
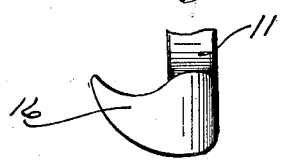
Fig. 1
Fig. 3
Fig. 4
Inventor
Julius Bjornlie
By his Attorneys June 12, 1928.  1,673,439
J. BJORNLIE
RIM TOOL
Filed June 21, 1926   2 Sheets-Sheet 2
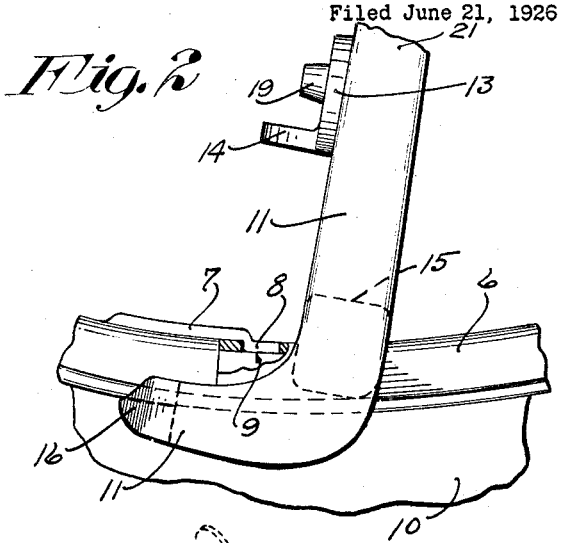
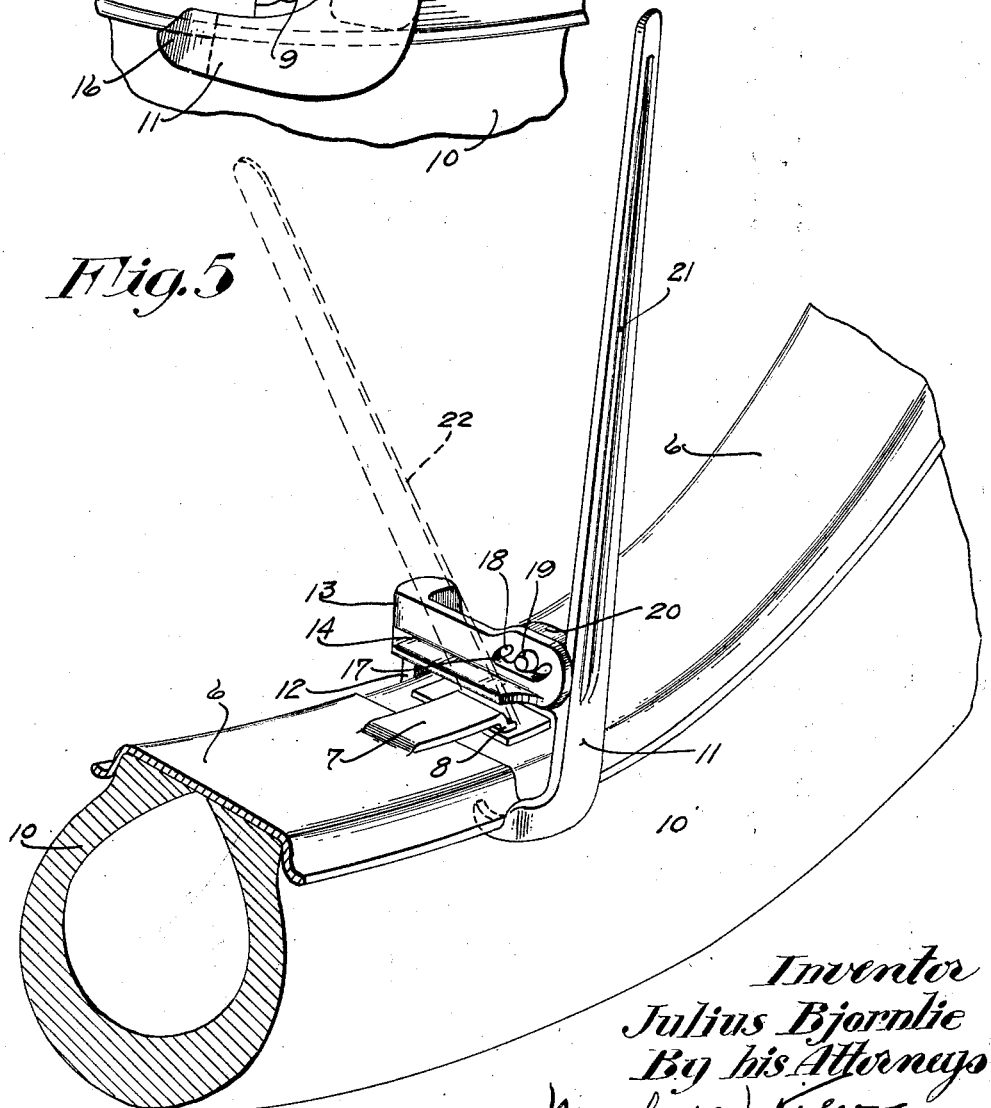
Inventor
Julius Bjornlie
By his Attorneys Patented June 12, 1928.

1,673,439

UNITED STATES PATENT OFFICE.

JULIUS BJORNLIE, OF MINNEAPOLIS, MINNESOTA.

RIM TOOL.

Application filed June 21, 1926. Serial No. 117,388.

My present invention has for its object to provide an extremely simple and highly efficient rim tool, and to this end it consists of the novel devices and combinations of devices hereinafter described and defined in the claims.

In the accompanying drawings, which illustrate the invention, like characters indicate like parts throughout the several views.

Referring to the drawings:

Fig. 1 is a front elevation of the tool applied to a rim on which is mounted a tire casing, said rim and casing being shown in section;

Fig. 2 is a fragmentary side elevation of the parts shown in Fig. 1, with some parts sectioned;

Fig. 3 is a detail view with some parts sectioned on the irregular line 3—3 of Fig. 1;

Fig. 4 is a fragmentary view of one of the arms and its grapple; and

Fig. 5 is a fragmentary perspective view showing the tool as used to expand the rim in mounting a tire thereon, some parts being indicated by broken lines.

For the purpose of illustrating the invention in working position there is illustrated in the drawings a circumferentially expansible and contractable wheel rim, the ends of which are detachably connected by a circumferentially extended tongue 7 on one end of said rim and having a lock lug 8 arranged to enter a lock seat 9 in the other end portion of said rim by reverse radial movements of the end portions of the rim 6. Said rim 6 is for tire casings 10 having straight sides.

Referring now in detail to the improved tire tool, the numerals 11 and 12 indicate a pair of laterally spaced arms connected at their inner ends by a bridge bar 13 having on the lower edge portion of its face a laterally projecting reinforcing rib 14. Formed on the inner face of the arms 11 and 12 at the intermediate portions thereof is a pair of fulcrum lugs 15. The outer end portions of the arms 11 and 12 are curved forwardly and terminate in laterally projecting toe pieces 16. The bridge bar 13 is integrally formed in the arm 12 and is connected to the arm 11 by a joint which permits reverse swinging movements of the arms 11 and 12 toward and from each other but rigidly holds said arms for common movement longitudinally of the rim tool. This joint comprises a longitudinal slot 17 in the bridge bar 13 having a plurality, as shown there, inwardly extended oblique lateral lock notches 18 and a headed stud 19 on an inwardly projecting angle lug 20 integrally formed in the arm 11. The headed stud 19 is arranged to enter any one of the lock notches 18 and adjustably connect the arms 11 and 12 for application to rims of different widths.

The contacting faces of the bridge bar 13 and the lug 20 are relatively wide and securely held by the headed stud 19 so that the arms 11 and 12 are rigidly held for common movement longitudinally of the tool but at the same time are free for reverse swinging movement transversely of the tool. Integrally formed with the arm 11 and forming an extension thereof is an inwardly projecting lever 21.

In applying the rim tool to the rim 6 for the purpose of contracting the same to remove the casing 10 therefrom, said tool is inserted through said rim with the bridge bar 13 extending transversely thereof and substantially radially aligned with the joint in the rim 6. The arms 11 and 12 are then separated sufficiently to permit the toe pieces 16 to clear the side flanges of the rim 6. Said arms 11 and 12 are then closed with their fulcrum lugs 15 resting on the inner faces of the side flanges of the rim 6 and with the toe pieces 16 engaging the outer faces of said flanges on the other side of said joint. The shape of the toe pieces 16 is such that they will freely enter between the sides of the casing 10 and the side flanges of the rim 6. The lever 21 is then rocked in a plane parallel to the rim 6, thus producing an inward radial movement of the toe pieces 16 which radially separates the ends of the rim 6 and lifts the lock lug 8 from its seat 9. Said lever 21 is then moved axially outward in respect to the rim 6 which causes the arms 11 and 12 to swing toward each other on the pivot stud 19 and thereby move the ends of the rim 6 out of alignment with each other. The rim tool is then removed from the rim 6 and by the use of a flat bar 22, which is indicated by broken lines in Fig. 5, the ends of the rim 6 may be further pried out of alignment and the casing 10 pried from said rim.

To expand the rim 6 after the casing 10 has been mounted thereon the tool is applied to the rim 6 in the same manner as that described with the exception that the fulcrum lugs 15 and the toe pieces 16 engage the rim 6 on the same side of the joint so that an outward radial pull on the lever 21 will rigidly secure the same to the rim 6. With the tool thus applied, the bar 22 is placed between the rib 14 and the outer end of the tongue 7, as indicated by broken lines in Fig. 5, and used as a lever to circumferentially expand the rim 6 and cause the lock lug 8 to enter its seat 9. During the use of the bar 22 to expand the rim 6 the rib 14 is used as a fulcrum.

Obviously, the lock notches 18 and headed stud 19 permit the tool to be very quickly adjusted for rims of different widths.

From the above description it is evident that during the operation of the tool to contract a rim, the position thereof on the rim is not changed during the movement of the tool to separate the lock and move the end portions of the rim in reverse radial movements in respect to each other and a lateral movement of the lever to operate the tool to move the end portions of the rim out of axial alignment.

What I claim is:

A rim tool comprising a pair of laterally spaced arms each having an inwardly and laterally projecting fulcrum lug and an inwardly and laterally projecting toe piece spaced the latter in advance of the former, said fulcrum lugs and toe pieces being applicable to the opposite faces of the side flanges of a transversely divided rim with the joint thereof between the fulcrum lugs and the toe-pieces, a jointed bridge bar rigidly connecting the arms for rocking movement on their fulcrum lugs but with freedom for angular lateral movements in respect to each other transversely of the rim, and a lever rigidly secured to one of the arms substantially perpendicular to the bridge bar.

In testimony whereof I affix my signature.

JULIUS BJORNLIE.